(No Model.)
J. H. COWL.
FRUIT JAR.
No. 282,849. Patented Aug. 7, 1883.
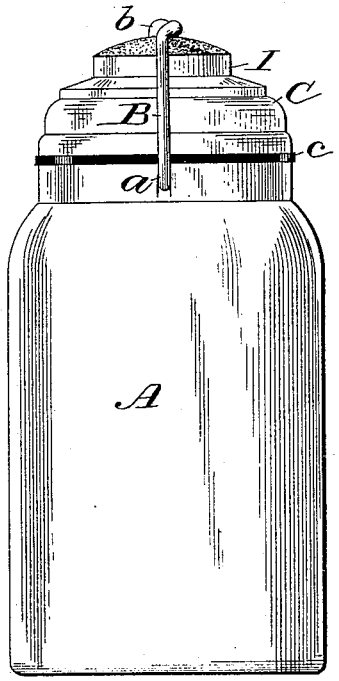
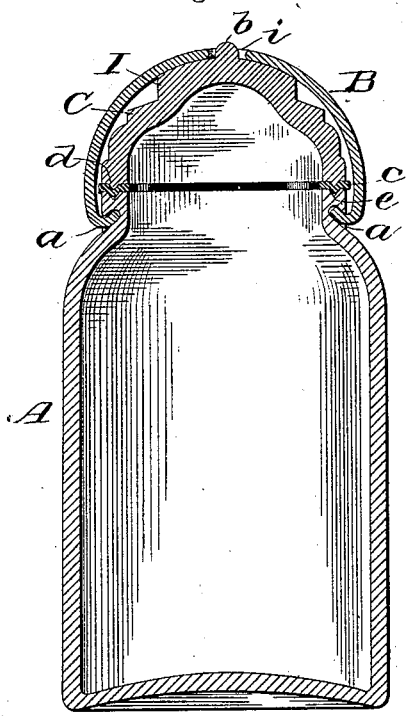
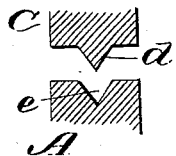
Witnesses:
Jas. F. DuHamel
Walter S. Dodge
Inventor;
J. H. Cowl.
by Dodge&Son
Attys

UNITED STATES PATENT OFFICE.

JOSEPH H. COWL, OF WHEELING, WEST VIRGINIA.

FRUIT-JAR.

SPECIFICATION forming part of Letters Patent No. 282,849, dated August 7, 1883.

Application filed March 29, 1883. (No model.)

*To all whom it may concern:*

Be it known that I, JOSEPH H. COWL, of Wheeling, in the county of Ohio and State of West Virginia, have invented certain Improvements in Fruit-Jars, of which the following is a specification.

My invention relates to fruit-jars; and the invention consists in the combination, in the jar, of certain features whereby it is rendered exceedingly easy of manipulation and efficient in action, all as hereinafter more fully set forth.

Figure 1 is a side elevation; Fig. 2, a central vertical section; and Fig. 3 is a sectional view of a portion enlarged to more fully show the construction.

Various styles of fruit-jars have heretofore been made, and with a great variety of fastenings. One of the greatest objections to many of them has been the difficulty, if not impossibility, of sealing them so as to be and remain air-tight, without which the fruit will not be preserved. Another objection to many of them is the difficulty of opening them, especially after they have remained closed for a considerable period, and also the liability of the fastenings or other loose parts becoming lost or mislaid, thereby rendering their subsequent use impossible.

The object of my present invention is to produce a fruit-jar for family use which shall entirely obviate the foregoing difficulties, and that can be preserved and be ready for use whenever desired. To accomplish this result I construct the body A in the usual form and size, by blowing it of glass. The neck all around on its upper edge has formed in it a V-shaped groove, as shown more clearly in Fig. 3, and on opposite sides of the neck there are formed small recesses or cavities, as shown in Fig. 2, these cavities or recesses being inclined upward, as shown, more or less, in order to afford a good hold for the bent ends of the wire or bail B. The groove e, instead of being pressed in the glass, as is usual in similar work, is made, when the body of the jar is blown, by using a two-part mold with a hinged or detachable cap, with a correspondingly-shaped bead on its under side, against which the molten glass is blown. The cavities or recesses a are formed in the sides of the neck by a suitable tool while the glass is still in a plastic condition, all of which will be readily done by persons skilled in the art, and which therefore need not be further described. Having thus constructed the body of the jar, I then make a cap or cover, C, also of glass, the lower edge of which is provided with a V-shaped bead or projection, d, corresponding to the V-shaped groove in the top of the neck, as more fully shown in Fig. 3. This cap C has a dome-shaped top, I, which is roughened on its exterior surface, as represented in Fig. 1, to prevent the bail B from slipping. At the center the cap has a small projection, l, to serve as a stop against which the bail B rests when the jar is closed, the bail having a small lateral bend, i, at that point, as shown in Figs. 1 and 2. The bail B consists of a piece of wire of the proper length, bent as shown, and having its ends turned inward to engage in the cavities a, formed in the sides of the neck of the jar, as shown in Fig. 2. The bail should be formed of wire that has been galvanized or tinned, to prevent rusting.

The above parts complete the jar proper; but in using it a rubber ring or gasket, c, is placed upon the grooved end of the neck, and the cap C placed thereon and pressed down, the V-shaped lip or bead forcing the rubber ring down into the groove e, as shown in Fig. 2. The bail B is swung up over the cap, and, being forced up the inclined surface of the dome I until it strikes the stop l, it presses the parts more tightly together, thereby closing or sealing the jar perfectly. The roughened surface of the dome part I of the cap prevents the bail from being accidentally displaced in handling or shipping the jars after they have been filled. To open the jar it is only necessary to shove the bail off of the part I, when the cap and ring c can be removed, and which can be done by the hands without the use of any tools whatever, unless it be to pry up the cap after the bail is swung off, and with far less effort than is required to remove the ordinary screw-cap.

The bail, being securely attached to the jar, is not liable to be mislaid or lost when the jar is not in use. The rubber ring can either be placed inside of the jar when empty, or it can be held in place between the body and cap, the same as when the jar is in use, and thus there is no danger of any of the parts being lost or mislaid, and the jar can be kept and used over and over again. The cap being wholly of glass, it will be seen no metallic substance is brought in contact with the contents of the jar, which therefore cannot be injured thereby, nor can any metallic part be rusted by such contact. By these means I produce a jar that fulfills all the requirements of a perfect fruit-jar, and that is especially well adapted for use by families.

I am aware that fruit-jars have been patented showing grooves and lips of various styles; also, that sockets have been shown in the sides of the jar for the ends of the bail to engage in, and that a recess or notch has been formed on the top of the cover to hold the bail in place, and therefore I do not claim either of these features, separately considered; but What I do claim is—

1. A fruit-jar consisting of the body A, having a V-shaped groove formed in the top edge of its neck, and the inclined recesses $a$ in the sides thereof, with the cap C, provided with the V-shaped bead or lip $d$, and the bail B, all constructed to operate substantially as set forth.

2. In combination with the body A, provided with the swinging clamping-bail B, the cover C, having its top portion, I, on which the bail rests, roughened, to prevent the same from slipping off, substantially as set forth.

JOSEPH H. COWL.

Witnesses:
H. STERLING,
JOHN E. COYLE.